US010010069B2

(12) United States Patent
Denson

(10) Patent No.: US 10,010,069 B2
(45) Date of Patent: Jul. 3, 2018

(54) BIRD MOTION SIMULATOR DECOY SYSTEM

(71) Applicant: Billy Mitchell Denson, Petal, MS (US)

(72) Inventor: Billy Mitchell Denson, Petal, MS (US)

( * ) Notice: Subject to any disclaimer, the term of this patent is extended or adjusted under 35 U.S.C. 154(b) by 142 days.

(21) Appl. No.: 15/340,973

(22) Filed: Nov. 1, 2016

(65) Prior Publication Data

US 2017/0118978 A1    May 4, 2017

Related U.S. Application Data

(60) Provisional application No. 62/249,302, filed on Nov. 1, 2015.

(51) Int. Cl.
*A01M 31/00* (2006.01)
*A01M 31/06* (2006.01)

(52) U.S. Cl.
CPC .................. *A01M 31/06* (2013.01)

(58) Field of Classification Search
CPC ....... A01M 31/00; A01M 31/02; A01M 31/06
USPC .......................................................... 43/3, 2
See application file for complete search history.

(56) References Cited

U.S. PATENT DOCUMENTS

| | | | | |
|---|---|---|---|---|
| 3,079,719 A * | 3/1963 | Muszynski | ........... | A01M 31/06 43/3 |
| 6,079,140 A * | 6/2000 | Brock, IV | ............. | A01M 31/06 43/3 |
| 6,408,558 B1 * | 6/2002 | Cornell, Jr. | ........... | A01M 31/06 43/2 |
| 6,574,902 B1 * | 6/2003 | Conger | ................. | A01M 31/06 43/2 |
| 6,901,693 B1 * | 6/2005 | Crowe | ................... | A01M 31/06 43/2 |
| 7,322,144 B2 * | 1/2008 | Brewer | ................. | A01M 31/06 43/3 |
| 7,814,857 B2 * | 10/2010 | Hally | .................... | A01M 29/16 116/22 A |
| 7,963,064 B2 * | 6/2011 | Smith | .................... | A01M 31/06 43/2 |
| 8,245,436 B2 * | 8/2012 | Dunkin | ................. | A01M 31/06 43/2 |
| 8,950,103 B2 * | 2/2015 | Bullerdick | ............ | A01M 31/06 43/2 |
| 9,010,013 B2 * | 4/2015 | Smith | .................... | A01M 31/06 43/2 |

* cited by examiner

*Primary Examiner* — Richard Thomas Price, Jr.

(57) ABSTRACT

A bird motion simulator decoy system uses a pulley system supported by a plurality of stanchions and driven by a motor to create a continuous, circuitous loop of moving decoys attached to a pulley belt. The stanchions each have a pulley support arm connected extending from a central shaft, to which at least one pulley is connected. The pulley belt is engaged with each of the pulleys. The stanchions are either affixed into the ground by a ground anchor or to a tree by ratchet straps. A plurality of decoy attachments is affixed to the pulley belt, and as the motor drives the pulley, the decoy attachments move in a continual loop, simulating bird motion.

15 Claims, 5 Drawing Sheets

BIRD MOTION SIMULATOR DECOY SYSTEM

The current application claims a priority to the U.S. Provisional Patent application Ser. No. 62/249,302 filed on Nov. 1, 2015.

FIELD OF THE INVENTION

The present invention relates generally to hunting. More particularly, the present invention relates to animal decoys.

BACKGROUND OF THE INVENTION

Waterfowl hunting is the practice of hunting ducks, geese or other waterfowl for food and sport. Many types of ducks and geese share the same habitat, have overlapping or identical hunting seasons, and are hunted using the same methods. Thus it is possible to take different species of waterfowl in the same outing. Waterfowl can be hunted in crop fields where they feed, or, more frequently, on or near bodies of water such as rivers, lakes, ponds, swamps, sloughs, or oceanic coastlines.

Decoys are replica waterfowl that are used to attract birds to a location near a hunter; they are an important piece of equipment for the waterfowler. Using a good spread of decoys and calling, an experienced waterfowl hunter can successfully bag ducks or geese if waterfowl are flying that day.

Lifelike movement of decoys adds attraction for waterfowl. Typical motion decoys for ducks, geese or other birds currently are held in place by a stake or anchor, but does not allow the decoy to move around in order to simulate swimming or eating. The present invention seeks to solve this problem by allowing the decoys to move around in a circular pattern or other pattern around an area. The present invention may also allow the decoys to partially submerge to simulate feeding. This will allow the system to simulate flocks of game swimming in groups while feeding for a more realistic decoy presentation.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced without the implementation of some features as they are described. It should be understood that some details have not been described in detail in order to not unnecessarily obscure focus of the invention.

Figure 1:
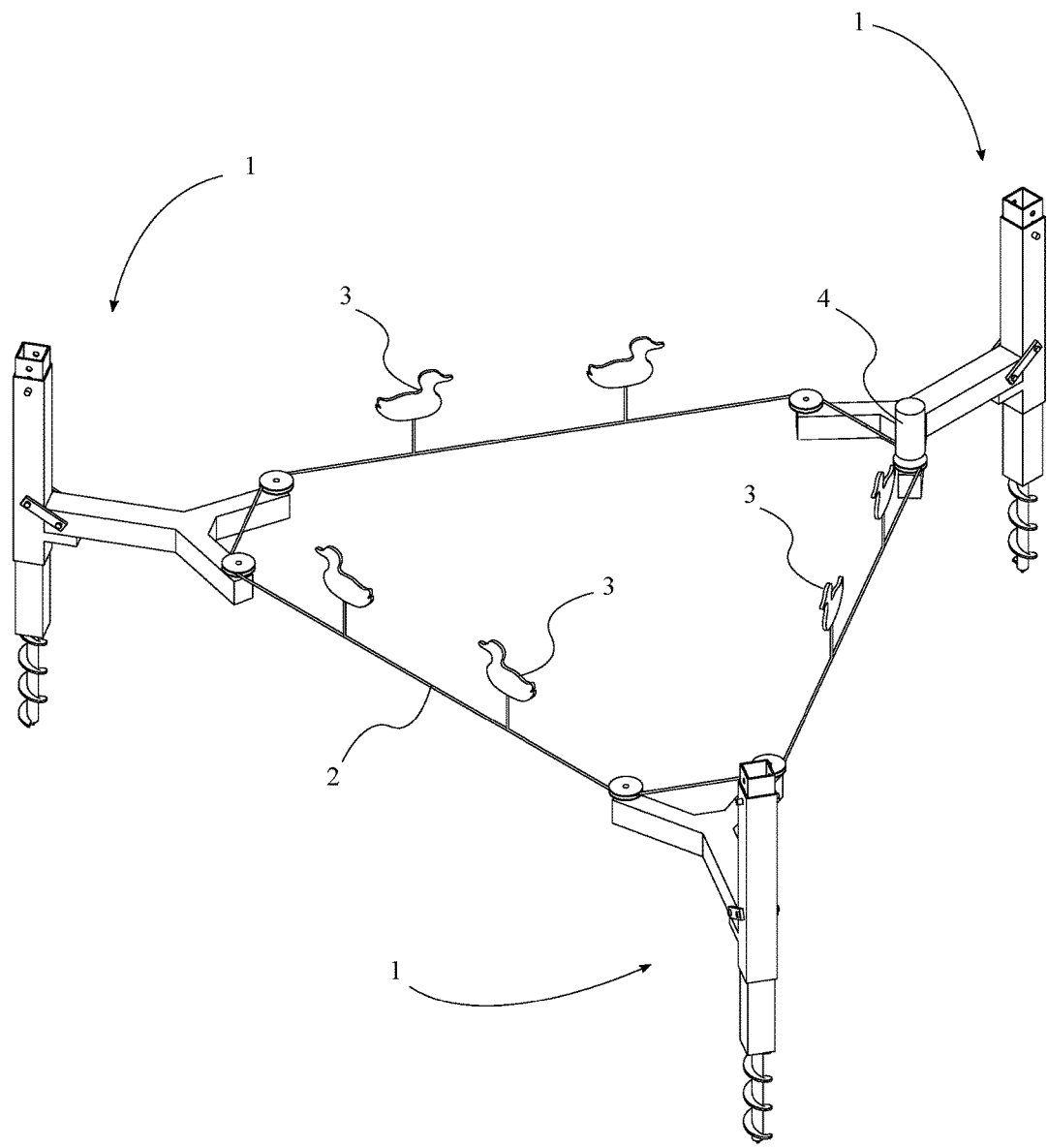
FIG. 1 is a perspective view of the entire system of the present invention.

The present invention is a system for simulating bird motion, primarily as a decoy system for hunting purposes. Referring to FIG. 1, the preferred embodiment of the present invention generally comprises a plurality of stanchions 1, a pulley belt 2, a plurality of decoy attachments 3, and a motor 4. The plurality of stanchions 1 supports the pulley belt 2, to which the plurality of decoy attachments 3 is attached. The motor 4 drives the pulley belt 2, causing the plurality of decoy attachments 3 to move in a circuit around the plurality of stanchions 1, simulating bird motion.

Figure 2:
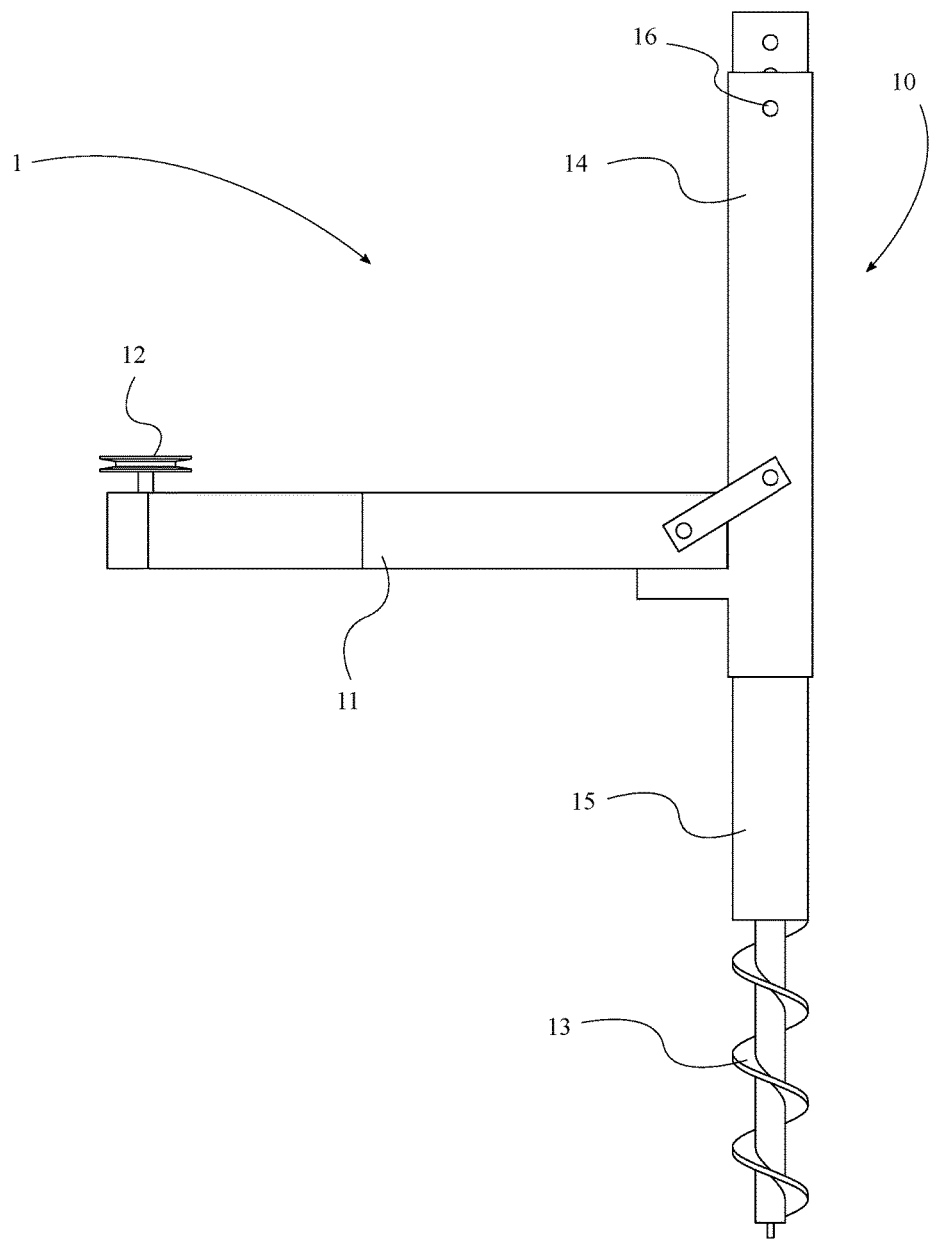
FIG. 2 is a side view of one of the stanchions.
Figure 3:
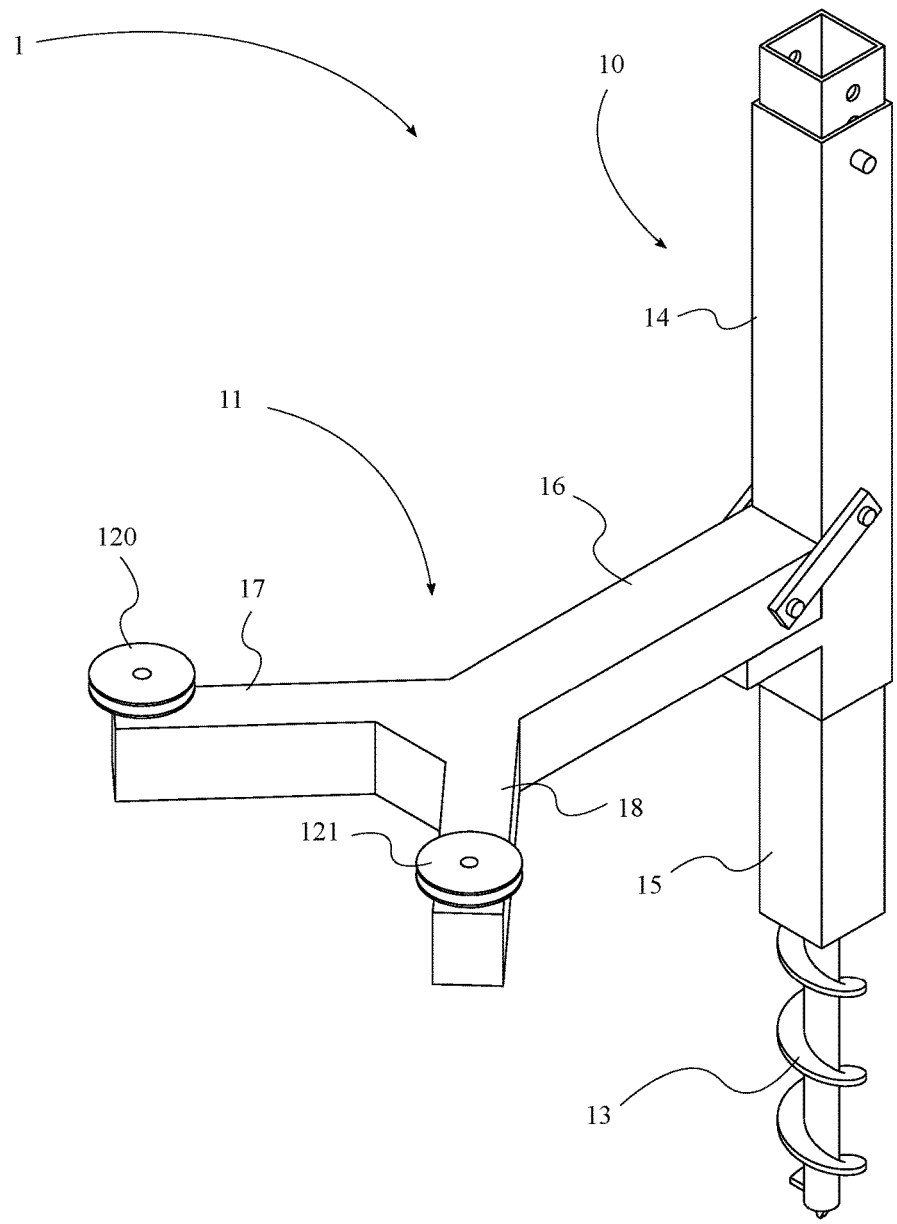
FIG. 3 is a perspective view of one of the stanchions.
Figure 4:
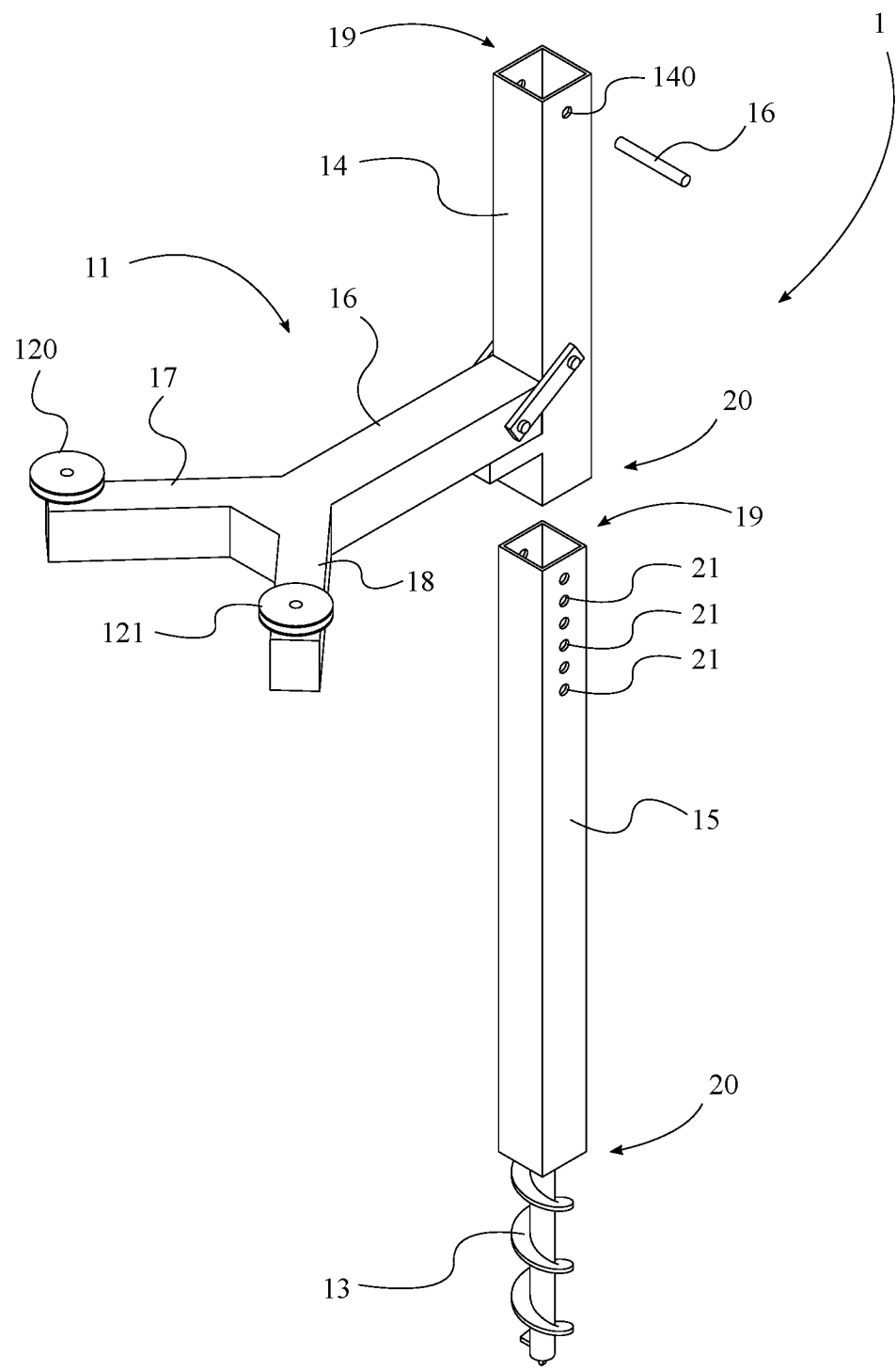
FIG. 4 is an exploded perspective view of one of the stanchions.

Referring to FIGS. 2-4, in the preferred embodiment, each of the plurality of stanchions 1 comprises a main shaft 10, a pulley support arm 11, and at least one pulley 12. The pulley support arm 11 is connected at an angle to the main shaft 10, so that the pulley support arm 11 extends away from the main shaft 10. In the preferred embodiment, the pulley support arm 11 is perpendicularly connected to the main shaft 10, though in other embodiments the pulley support arm 11 may be connected at an angle to the main shaft 10 which is greater than or less than 90 degrees. For each stanchion 1, each pulley is connected to the pulley support arm 11 opposite the main shaft 10. The stanchions 1 are separated from each other in a circuitous arrangement. For example, the stanchions 1 may be arranged in a rectangular arrangement, in a triangular arrangement, or in any n-gonal arrangement, where n is the number of stanchions 1 provided. The circuitous arrangement should not be limited to a polygon however, and any arrangement may be utilized that allows the decoy attachments 3 to be moved in a continuously looping circuit. In one embodiment, the stanchions 1 are affixed into the ground. In another embodiment, the stanchions 1 may be attached to secondary support objects such as trees. The present invention should be set up to be largely underwater except for the plurality of decoy attachments 3 in order to conceal the pulley belt 2, motor 4, stanchions 1 and other components for a maximally realistic display.

The pulley belt 2 is operatively engaged with each pulley of each stanchion 1. Each of the plurality of decoy attachments 3 is connected to the pulley belt 2, and the plurality of decoy attachments 3 is distributed along the pulley belt 2. It is contemplated that only a single decoy attachment may be comprised; however, it is generally more desirable to have multiple decoy attachments 3. The decoy attachments 3 may be attached to the pulley belt 2 through any useful and applicable means, such as, but not limited to, adhesives, slots, or fasteners such as screws, bolts, clips, clamps, or other any other means. The decoy attachments 3 may be permanently connected to the pulley belt 2, or the decoy attachments 3 may be removable. In one embodiment, the pulley belt 2 comprises a plurality of decoy receiving stations equally distributed along the length of the pulley belt 2 in order to enable customizable placement of the decoy attachments 3 along the pulley belt 2. The motor 4 is operatively engaged with the pulley belt 2, and functions to drive the pulley belt 2 in a circuitous fashion, progressing from one stanchion 1 to another in a continuous loop. In the preferred embodiment, the motor 4 is connected to one of the plurality of stanchions 1. In another embodiment, the motor 4 may be separated from the stanchions 1, and may be engaged with the pulley belt 2 as a node in the circuitous arrangement, being secured to the ground, a tree or otherwise isolated from the stanchions 1.

It should be understood that all the components of the present invention may be made of any suitable material, and be made to any specification that enables the present invention to function correctly. However, in the preferred embodiment, the pulley belt 2 is a polyurethane, round 4 mm belt that is water and ultraviolet light-proof. A round belt drive pulley made from fiberglass reinforced nylon is connected to the draft shaft of the motor 4, and converts rotational force from the motor 4 into translational force to the pulley belt 2 in order to drive the pulley. Each pulley that is not the drive pulley is a V belt idler pulley, also made from fiberglass reinforced nylon. Each pulley should furthermore have a clevis adapter, and a waterproof bearing. CCM DC motor speed controller module is used to regulate the speed of the motor. The motor 4 is a 12-volt motor, and is preferably a 30-pound trolling motor low unit, and is waterproof. Any suitable power source may be utilized for the motor 4, but preferably a 12-volt waterproof battery is connected in order to power the motor 4. Each of the plurality of stanchions 1 are preferably made of metal, such as, but not limited to, aluminum, stainless steel, or other metal materials.

In order for the present invention to function properly, each of the stanchions 1 must have a means of remaining generally upright. In one embodiment, each of the plurality of stanchions 1 further comprises a ground anchor 13. The ground anchor 13 is connected adjacent to a lower end of the main shaft 10, separated from the pulley support arm 11 along the main shaft 10. In one embodiment, the ground anchor 13 is an auger. In one embodiment, the ground anchor 13 is a stake. The ground anchor 13 may take any embodiment that facilitates the stanchions 1 being affixed upright into the ground. In one embodiment, each stanchion 1 comprises a plurality of legs radially distributed around the lower end of the main shaft 10 that allow the stanchion 1 to stand freely, similar to a tripod.

In the preferred embodiment of the present invention, the main shaft 10 of each stanchion 1 is adjustable in length. While it is acknowledged that there may be many ways to accomplish this, the foregoing is the current preferable means. The main shaft 10 is each of the plurality of stanchions 1 further comprises an upper shaft portion 14 and a lower shaft portion 15. The upper shaft portion 14 is hollow and dimensioned to accommodate the lower shaft portion 15; thus, that the lower shaft portion 15 is slidably engaged within the upper shaft portion 14. The total length of the main shaft 10 may be adjusted by temporarily affixing the upper shaft portion 14 and the lower shaft portion 15 in various positions relative to each other. The ground anchor 13 is connected to the lower shaft portion 15, and the pulley support arm 11 is connected to the upper shaft portion 14.

Furthermore, referring to FIG. 4, the upper shaft portion 14 and the lower shaft portion 15 each comprise an upper end 19 and a lower end 20. The upper end 19 of the lower shaft portion 15 is removably inserted into the lower end 20 of the upper shaft portion 14. The pulley support arm 11 is hingedly connected adjacent to the lower end 20 of the upper shaft portion 14. The ground anchor 13 is connected to the lower end 20 of the lower shaft portion 15.

Each stanchion 1 further comprises a pin 16. The upper end 19 of the upper shaft portion 14 comprises an upper pin hole 140 that traverses perpendicularly through the upper end 19 of the upper shaft portion 14. The upper end 19 of the lower shaft portion 15 comprises a plurality of lower pin holes 21 that traverse perpendicularly through the upper end 19 of the lower shaft portion 15. The pin 16 is removably positioned within the upper pin hole 140 and one of the lower pin holes 21; thus, the upper shaft portion 14 and the lower shaft portion 15 are adjustably attached to each other by the pin 16.

In the preferred embodiment of the present invention, the pulley support arm 11 is terminally and hingedly connected to the main shaft 10. It is desirable for the pulley support arm 11 to be able to hinge upwards against the main shaft 10 for convenient transport and storage.

In the preferred embodiment, the at least one pulley 12 of each of the plurality of stanchions 1 comprises a first pulley 120 and a second pulley 121. The first pulley 120 and the second pulley 121 are laterally separated from each other across the pulley support arm 11, wherein the pulley support arm 11 extends longitudinally from the main shaft 10. It is desirable to have two pulleys on each stanchion 1 for adequate support of the pulley belt 2.

It should be noted that the pulley support arm 11 may take any form that enables one or two pulleys to be properly supported for pulley functionality. However, in the preferred embodiment the pulley support arm 11 comprises a central arm 16, a first lateral arm 17, and a second lateral arm 18. The central arm 16 is connected perpendicularly to the main shaft 10. The first lateral arm 17 and the second lateral arm 18 are connected to the central arm 16, opposite the main shaft 10 along the central arm 16. The first lateral arm 17 and the second lateral arm 18 are positioned laterally opposite each other across the main shaft 10. The first pulley 120 is connected to the first lateral arm 17 opposite the central arm 16 along the first lateral arm 17. Thus, in the preferred embodiment, the central arm 16, the first lateral arm 17, and the second lateral arm 18 generally form a "Y" shape for the pulley support arm 11.

Figure 5:
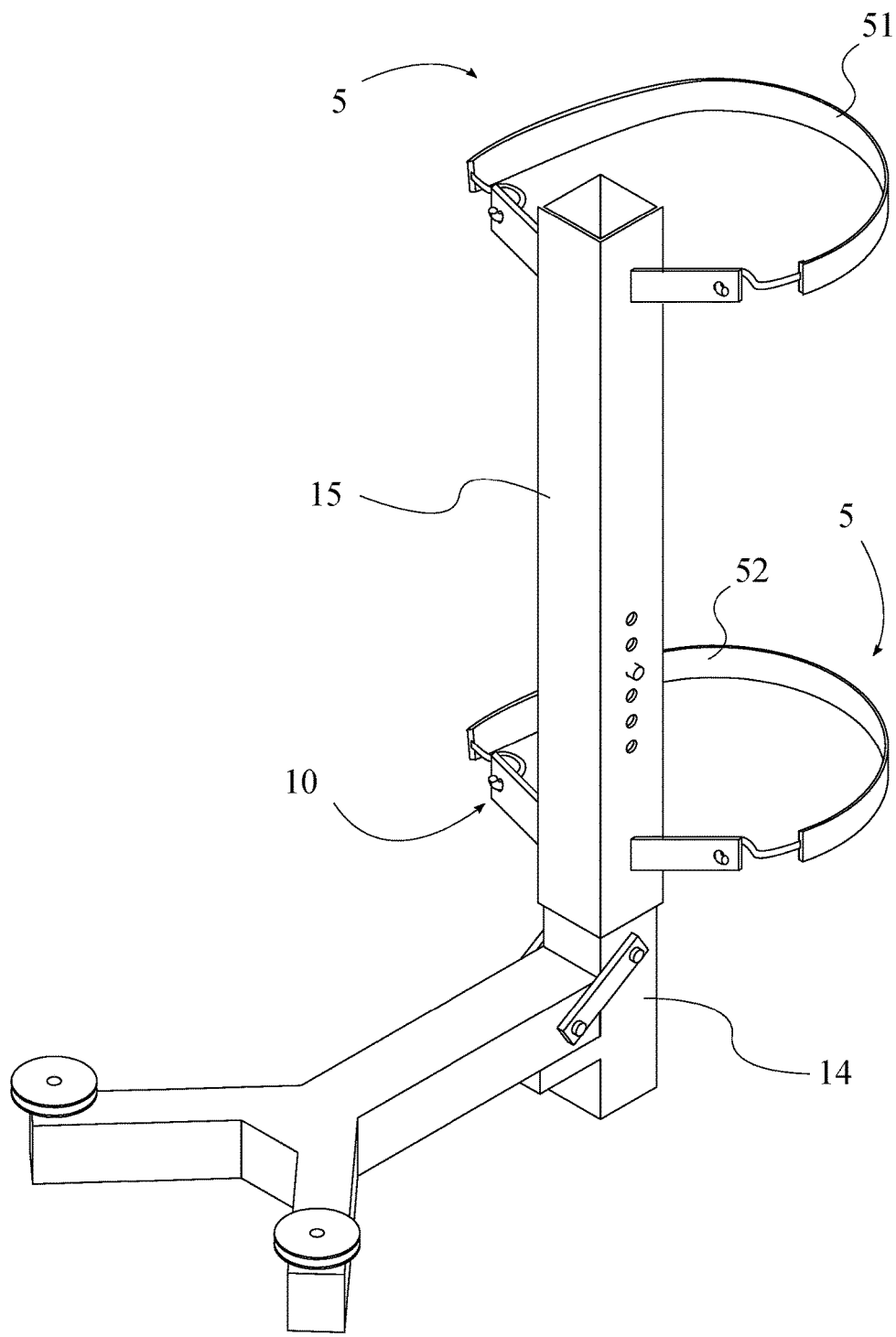
FIG. 5 is a perspective view of an alternate embodiment of one of the stanchions with straps for attachment to a tree.

Referring to FIG. 5, in an alternate embodiment of the present invention each of the plurality of stanchions 1 is affixed to a tree instead of into the ground. In this embodiment, each of the plurality of stanchions 1 further comprises at least one tree mounting attachment, and each tree mounting attachment is connected to the main shaft 10. In one embodiment, the at least one tree mounting attachment comprises a plurality of ratchet straps 5, and each of the plurality of ratchet straps 5 are laterally connected to the main shaft 10. In this embodiment, the upper shaft portion 14 and the lower shaft portion 15 are reversed in position, with the portion of the main shaft with the attached pulley support arm 11 being inserted into the other portion of the shaft from below. Thus, the ratchet straps 5 are laterally connected to the lower shaft portion 15, or simply the outer portion of the main shaft 10. The ratchet straps 5 are connected and tightened around a tree in order to affix the stanchion 1 to the side of the tree. In the preferred embodiment, the plurality of ratchet straps 5 comprises an upper strap 51 and a lower strap 52. Furthermore, in the preferred embodiment the main shaft 10 of each stanchion 1 comprises a first upper strap attachment hole, a second upper strap attachment hole, a first lower strap attachment hole, and a second lower strap attachment hole. A first end of the upper ratchet strap is hooked into the first upper strap attachment hole, looped around the tree, and a second end of the upper ratchet strap is hooked into the second upper strap attachment hole, and the upper ratchet strap is then tightened around the tree. Similarly, a first end of the lower ratchet strap is hooked into the first lower strap attachment hole, looped around the tree, and a second end of the lower ratchet strap is hooked into the second lower strap attachment hole, and the lower ratchet strap is then tightened around the tree, thus affixing the stanchion 1 against the supporting tree.

Although the invention has been explained in relation to its preferred embodiment, it is to be understood that many other possible modifications and variations can be made without departing from the spirit and scope of the invention as hereinafter claimed.

What is claimed is:

1. A bird motion simulator decoy system comprises:
   a plurality of stanchions;
   a pulley belt;

a plurality of decoy attachments;

a motor;

each of the plurality of stanchions comprises a main shaft, a pulley support arm, and at least one pulley;

the pulley support arm being connected at an angle to the main shaft, wherein the pulley support arm extends away from the main shaft;

each pulley being connected to the pulley support arm opposite the main shaft for each stanchion;

the pulley belt being operatively engaged with each pulley of each stanchion;

each of the plurality of decoy attachments being connected to the pulley belt;

the plurality of decoy attachments being distributed along the pulley belt; and the motor being operatively engaged with the pulley belt.

2. The bird motion simulator decoy system as claimed in claim 1 comprises:

the plurality of stanchions being separated from each other in a circuitous arrangement.

3. The bird motion simulator decoy system as claimed in claim 1 comprises:

the pulley support arm being perpendicularly connected to the main shaft.

4. The bird motion simulator decoy system as claimed in claim 1 comprises:

the main shaft being adjustable in length.

5. The bird motion simulator decoy system as claimed in claim 1 comprises:

each of the plurality of stanchions further comprises a ground anchor; and the ground anchor being connected adjacent to a lower end of the main shaft, separated from the pulley support arm along the main shaft.

6. The bird motion simulator decoy system as claimed in claim 5 comprises:

the ground anchor being an auger.

7. The bird motion simulator decoy system as claimed in claim 1 comprises:

each of the plurality of stanchions further comprises at least one tree mounting attachment; and each tree mounting attachment being connected to the main shaft.

8. The bird motion simulator decoy system as claimed in claim 7 comprises:

the at least one tree mounting attachment comprises a plurality of ratchet straps; and each of the plurality of ratchet straps being laterally connected to the main shaft.

9. The bird motion simulator decoy system as claimed in claim 1 comprises:

the main shaft of each of the plurality of stanchions further comprises an upper shaft portion and a lower shaft portion;

the lower shaft portion being slidably engaged within the upper shaft portion;

the ground anchor being connected to the lower shaft portion; and the pulley support arm being connected to the upper shaft portion.

10. The bird motion simulator decoy system as claimed in claim 9 comprises:

the upper shaft portion and the lower shaft portion each comprise an upper end and a lower end;

the upper end of the lower shaft portion being removably inserted into the lower end of the upper shaft portion;

the pulley support arm being hingedly connected adjacent to the lower end of the upper shaft portion; and the ground anchor being connected to the lower end of the lower shaft portion.

11. The bird motion simulator decoy system as claimed in claim 10 comprises:

each stanchion further comprises a pin;

the upper end of the upper shaft portion comprises an upper pin hole;

the upper pin hole perpendicularly traversing through the upper end of the upper shaft portion;

the upper end of the lower shaft portion comprises a plurality of lower pin holes;

the plurality of pin holes perpendicularly traversing through the upper end of the lower shaft portion; and the pin being removably positioned within the upper pin hole and one of the lower pin holes, wherein the upper shaft portion and the lower shaft portion are adjustably attached to each other by the pin.

12. The bird motion simulator decoy system as claimed in claim 1 comprises:

the pulley support arm being terminally and hingedly connected to the main shaft.

13. The bird motion simulator decoy system as claimed in claim 1 comprises:

the motor being waterproof.

14. The bird motion simulator decoy system as claimed in claim 1 comprises:

the at least one pulley of each stanchion comprises a first pulley and a second pulley; and the first pulley and the second pulley being laterally separated from each other across the pulley support arm, wherein the pulley support arm extends longitudinally from the main shaft.

15. The bird motion simulator decoy system as claimed in claim 14 comprises:

the pulley support arm comprises a central arm, a first lateral arm, and a second lateral arm;

the central arm being connected to the main shaft;

the first lateral arm and the second lateral arm being connected to the central arm opposite the main shaft;

the first lateral arm and the second lateral arm being positioned laterally opposite each other across the main shaft;

the first pulley being connected to the first lateral arm opposite the central arm along the first lateral arm; and the second pulley being connected to the second lateral arm opposite the central arm along the second lateral arm.

* * * * *